Nov. 24, 1931.  D. M. WOLF ET AL  1,833,345
DEVICE FOR CORRECTING FOR MAGNETIC DECLINATION, DEVIATION, AND DRIFT
Filed May 8, 1929
FIG. I.
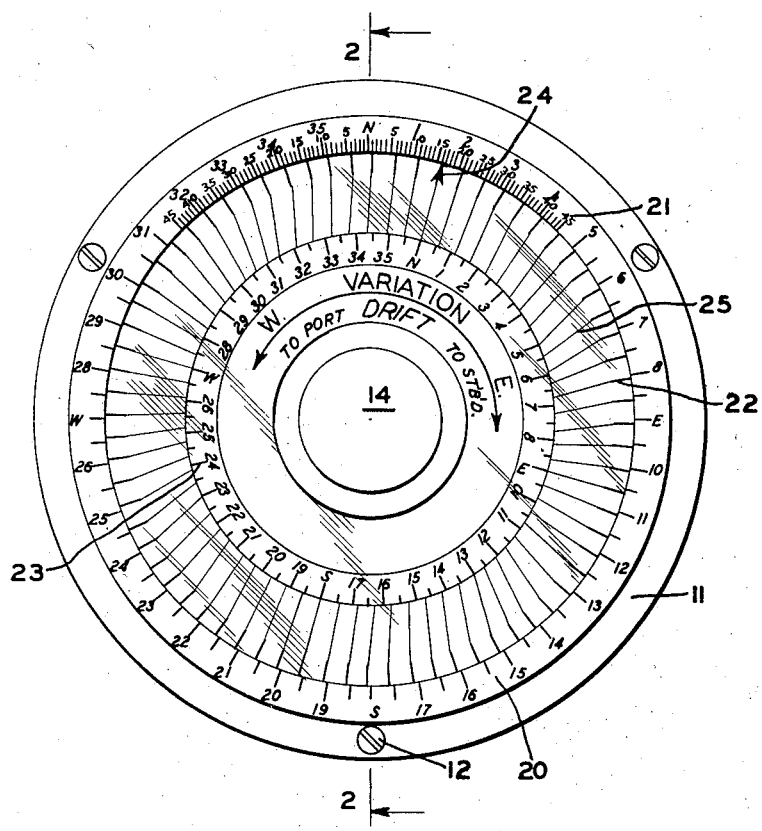
FIG. 2.
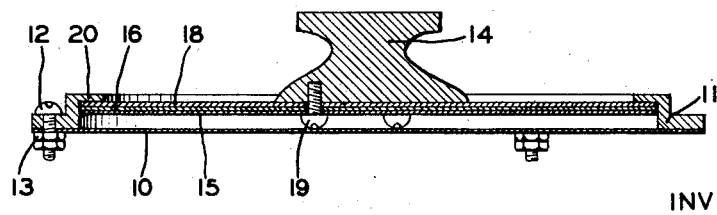
INVENTORS
D. M. WOLF
J. O. YORK
BY Hazard and Miller
ATTORNEYS Patented Nov. 24, 1931

1,833,345

UNITED STATES PATENT OFFICE

DARWIN M. WOLF, OF LONG BEACH, AND JONES O. YORK, OF COMPTON, CALIFORNIA

DEVICE FOR CORRECTING FOR MAGNETIC DECLINATION, DEVIATION, AND DRIFT

Application filed May 8, 1929. Serial No. 361,430.

This invention relates to devices used in navigation, either of aircraft or ships.

An object of the invention is to provide a device which will quickly and accurately correct for magnetic declination, deviation and drift. In determining the direction of a compass course which will give the proper true course it is usually customary to add or subtract the correcting magnitude due to magnetic declination, deviation and drift, mentally. Because of the three variables present it frequently occurs that an error is made and such error results in a material change in the compass course from the proper compass course which will correspond to the true course. The improved device is so designed as to eliminate this mental computation and to instantly give the correct compass course which will correspond to the true course.

Another object of the invention is to provide a device for correcting for magnetic declination, deviation and drift which is of cheap, simple and durable construction and which comprises a stationary dial or set of indicia representative of the indicia or points on a compass and a second dial which is movable relatively to the first dial and which carries two sets of indicia, each of which is representative of the indicia or points on a compass and to have these elements so arranged that by a single setting of the dial the correct compass course can be easily ascertained.

Another object of the invention is to provide an improved dial construction which will enable a dial to be adjusted relatively to the body or frame and frictionally held in adjusted position.

With the foregoing and other objects in view which will be made manifest in the following detailed description and specifically pointed out in the appended claims, reference is had to the accompanying drawings for an illustrative embodiment of the invention, wherein;

Fig. 1 is a plan view of the improved device for correcting for magnetic declination, deviation and drift.

Fig. 2 is a section taken upon the line 2—2 upon Fig. 1.

Referring to the accompanying drawings wherein similar reference characters designate similar parts throughout, the improved device comprises a base plate 10 on which is mounted a bezel 11. The bezel is fastened in place as by bolts 12 having nuts 13 and these bolts are of such length that they may be utilized to mount the device on a dash or other suitable support. A central knob or handle 14 is provided, on the base of which there is secured a circular metal plate 15. Over this metal plate there is positioned a card 16 which is covered by a layer of celluloid or similar transparent material indicated at 18. The celluloid, card and plate are secured to the bottom of the knob or handle by screws 19, the heads of which bear against the base plate 10 and are of sufficient depth so that the edges of the celluloid 18 will be pressed firmly against the flange 20 on the bezel. The plate 15 is somewhat resilient thus keeping the celluloid pressed tightly against the flange to hold the dial thus provided frictionally in adjusted position. The dial, however, can be rotated by the handle 14 in adjusting.

On the flange 20 of the bezel there is formed a set of indicia indicated at 21. These indicia correspond or are representative of the indicia or points on a compass, having letters indicating north, south, east and west and intermediate points suitably numbered to represent degrees between zero and 360. The top part of the scale or set of indicia on the flange 20 is preferably finely graduated as shown upon the drawings whereas the remainder of the scale may be more coarsely graduated. On the card 16 there are formed two sets of indicia, one set being indicated at 22 arranged near the periphery of the card. This set of indicia in a like manner corresponds to the indicia or points on a compass and may be of uniform graduations corresponding to the coarse graduations on the scale of the flange 21. The second set of indicia on the card is indicated at 23 and this set is arranged somewhat closely around the base of the knob or handle 14. Suitable identifying marks are placed thereon to identify these indicia with the points of a compass. The outer set of indicia 22 has one point or mark provided with an arrow indicated at 24.

When the card 16 is originally printed only the indicia above described and the printed matter such as the words, "Variation", "W.", "E.", "To port", "Drift", "To starboard", are printed on the card. If the device is to be installed upon a given aeroplane, a chart or table is first prepared indicating the deviation effect of that particular aeroplane upon its magnetic compass. In other words, the aeroplane is first pointed to the magnetic north and the effect of the metal parts, magnetos, generators, and the like upon the compass needle is first determined. The aeroplane is then placed in another position and the deviation or the effect of the aeroplane and its equipment upon the compass needle is determined for this position. Preferably at least eight such positions are taken and the quantity of deviation is determined. From this chart or table of the deviations on the compass needle in these various positions small lines are drawn, indicated at 25 which connect the indicia 22 to the indicia 23. As shown upon the drawings these lines will all be approximately radial but some lines will be on a true radius whereas other lines will be slightly inclined thereto. Points or lines drawn between those drawn from the table of deviations actually taken are interpolated. In this manner the lines 25 make a correction for deviation, that is, having a compass course which is found on the scale 22, this compass course can be corrected for deviation due to parts of the aeroplane by glancing inwardly along the nearest line 25 and reading the corrected compass course on the scale 23.

In using the device the magnetic declination for the locality must be known and this can be ascertained from any suitable and reliable source. For example, if the magnetic declination of a locality is 16 degrees east the pointer or arrow 24 on the dial is moved into the position shown, that is, 16 degrees to the east or to the right of due north. By thus shifting the dial a correction is made for the magnetic declination. After the dial has been so set the navigator can then ascertain what will be the proper compass course to give the true course desired. For example, if the true course desired is that on 120 degrees the navigator finds the mark or graduation 12 on the flange of the bezel. He then selects the graduation on the scale 22 nearest the graduation 12 on the bezel and glances inwardly along its line 25, locating where the line 25 meets the scale 23. By then interpolating the navigator can instantly determine that the proper compass course which he should follow in order to travel along the true course will be about 103 degrees, which will be corrected for both magnetic declination and deviation. If the navigator of an aeroplane is flying into a quartering wind or if there is drift present either of the aeroplane or of a ship, this drift is estimated and correction may be made for it also. For example, if the magnetic declination at the locality is 16 degrees and there is also a starboard drift of 5 degrees the navigator first sets the arrow 24 opposite the 16 degree graduation on the scale 21 to correct for the magnetic declination. Then he adds onto it five more degrees to correct for the five degrees starboard drift so that the dial will be set with the arrow 24 opposite the 21 degree graduation.

If, instead of having a starboard drift of five degrees there should be a port drift of five degrees the navigator after first having positioned the arrow 24 opposite the 16 degree graduation then moves it five degrees to the left to correct for the port drift and cause the arrow to be positioned opposite the 11 degree graduation. It will thus be seen that the setting of the dial by the handle or knob 14 corrects for magnetic declination and/or drift and that after the dial has been set the reading of the true course on the scale 21 is transferred by the lines 25 to the scale 23 giving the corresponding and corrected compass course thus making corrections for magnetic declination and/or drift and also making correction for deviation. It should be kept in mind that when the dial is set to make a correction for magnetic declination and then changed from this setting to make a correction for the second setting, that is, the one making the correction for both declination and drift, it will be slightly different from the deviation correction for the first setting or that setting making correction only for magnetic declination. This change in the deviation correction from the first setting or declination setting to the second setting or the combined declination and drift setting is frequently forgotten or lost sight of by experienced pilots or navigators. The improved device automatically takes care of this however, as the reading will be corrected for the proper deviation regardless of what declination and drift corrections may have been made. It will be noted that in using the device no mental computation need be made and the possibilities of making an error are practically completely eliminated in that not only will the navigator dispense with the possibility of error in adding or subtracting correctly but the error of possibly adding instead of subtracting or subtracting instead of adding in making the correction is also eliminated.

From the above described construction it will be appreciated that a device for correcting for magnetic declination, deviation and drift is provided which can be easily calibrated for any aircraft or ship and which makes it very easy to ascertain the correct compass course which will cause the aeroplane or ship to travel on the true course.

It will, of course, be understood that in making long journeys the magnetic declination will vary requiring that the dial be reset from time to time. Also the drift will vary frequently which also requires the dial to be reset. However, the setting of the dial is relatively simple, the amount of drift and amount of declination being known and after it has been set the correct compass course can be ascertained quite readily without requiring laborious mental computations which may result in serious error.

Various changes may be made in the details of construction without departing from the spirit or scope of the claims as defined by the appended claims.

We claim:

1. A device for determining the direction of a true course on a magnetic compass comprising a frame having a bezel, indicia on the bezel representative of the points on the frame beneath the bezel, said dial having two sets of indicia thereon representative of the points on a compass whereby the dial may be adjusted with respect to the bezel to correct for magnetic declination and/or drift and a relation may be established between the sets of indicia to correct for deviation whereby the compass course may be established from one of the sets on the dial opposite the true course represented on the bezel.

2. A device for determining the direction of a true course on a magnetic compass comprising a frame having a bezel, indicia on the bezel representative of the points on the frame beneath the bezel, said dial having two sets of indicia thereon representative of the points on a compass whereby the dial may be adjusted with respect to the bezel to correct for magnetic declination and/or drift and a relation may be established between the sets of indicia to correct for deviation whereby the compass course may be established from one of the sets on the dial opposite the true course represented on the bezel, said dial having projections on its under side to maintain the dial in frictional engagement with the bezel so that the dial may be held in any adjusted position.

In testimony whereof we have signed our names to this specification.

DARWIN M. WOLF.
JONES O. YORK.